No. 622,749. Patented Apr. 11, 1899.
S. L. WORSLEY.
FEEDING ATTACHMENT FOR TURRET LATHES.
(Application filed Oct. 18, 1897.)
(No Model.) 2 Sheets—Sheet 1.

WITNESSES
Ira L. Fish
A. A. Pates

INVENTOR
Samuel L. Worsley,
By Wilmarth H. Thurston,
Attorney.

No. 622,749. Patented Apr. 11, 1899.
S. L. WORSLEY.
FEEDING ATTACHMENT FOR TURRET LATHES.
(Application filed Oct. 18, 1897.)
(No Model.) 2 Sheets—Sheet 2.

WITNESSES
Ira L. Fish
R. A. Bates

INVENTOR
Samuel L. Worsley,
By Wilmarth H. Thurston,
Attorney.

United States Patent Office.

SAMUEL L. WORSLEY, OF TAUNTON, MASSACHUSETTS, ASSIGNOR TO THE BROWN & SHARPE MANUFACTURING COMPANY, OF PROVIDENCE, RHODE ISLAND.

FEEDING ATTACHMENT FOR TURRET-LATHES.

SPECIFICATION forming part of Letters Patent No. 622,749, dated April 11, 1899.

Application filed October 18, 1897. Serial No. 655,515. (No model.)

*To all whom it may concern:*

Be it known that I, SAMUEL L. WORSLEY, of Taunton, in the county of Bristol and State of Massachusetts, have invented certain new and useful Improvements in Feeding Attachments for Turret-Lathes or Similar Machines; and I do hereby declare the following specification, taken in connection with the accompanying drawings, forming a part of the same, to be a full, clear, and exact description of the invention.

The present improvements relate to machines for presenting blanks to a chuck or other suitable support which holds said blank in position to be acted upon by one or more tools, and has for its object to provide a mechanism which will be simple and efficient in operation and which can be readily applied to turret-lathes, screw-machines, and other machines of any analogous character. The mechanism comprises a magazine for holding the blanks to be acted upon, which is preferably secured to the frame of the machine at one side of the work-support, and a carrier which takes the blanks from the magazine and presents them in position to be ejected from said carrier directly on or into the work-support, the carrier then moving out of the way of the tools and back to the magazine to receive another blank. The improvements are shown applied to a machine for forming band-pulleys for sewing-machines in which the blanks are held in a revolving chuck and acted upon by tools carried by a turret and by two cross-slides, and the magazine and carrier are adapted to hold and carry the blanks for such pulleys. It will be understood, however, that by modifying the shape of the magazine and carrier the improvement may be adapted to feed various forms of blanks and that the blanks may be presented to other forms of work-supports.

Figure 1:
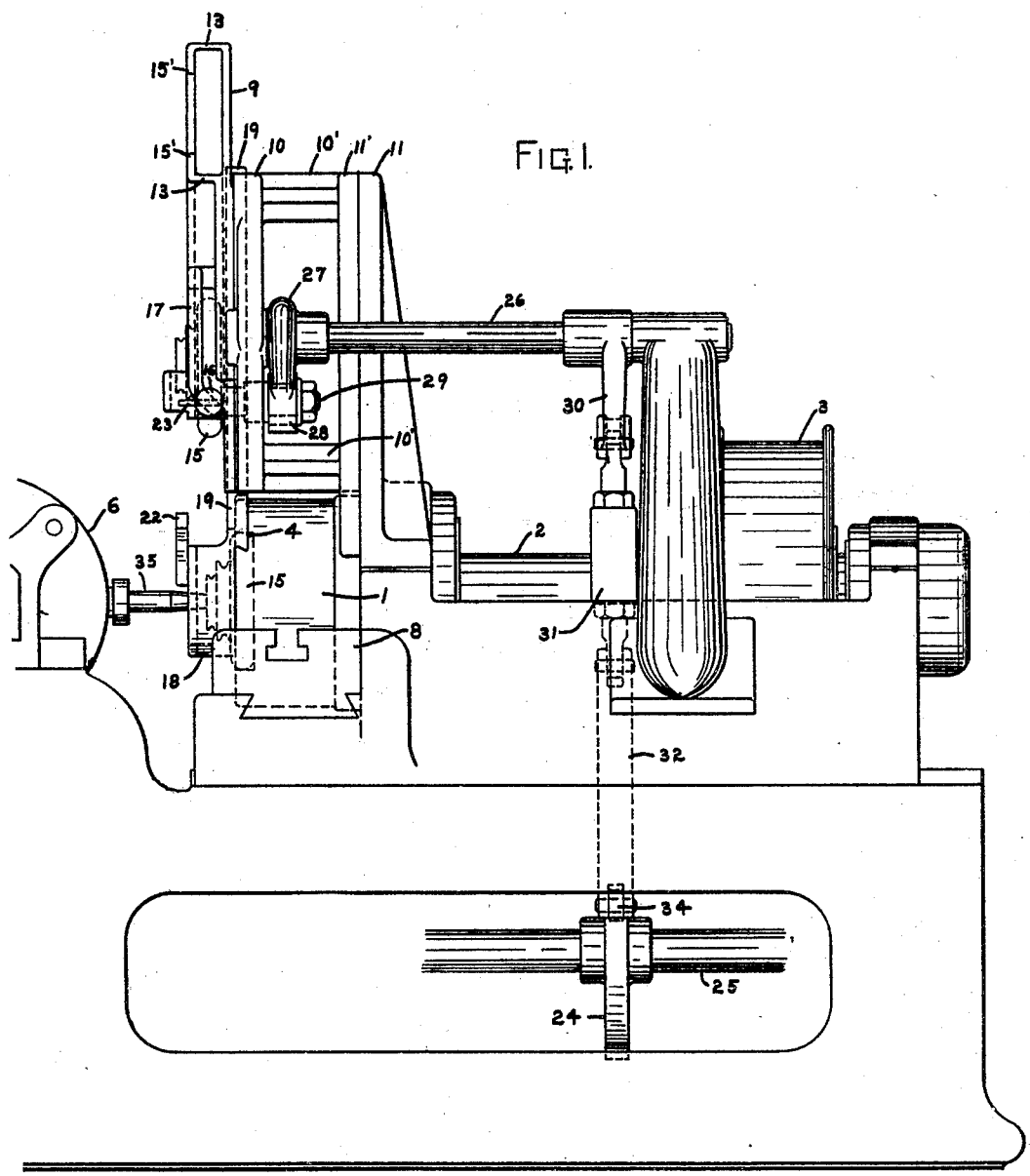
Figure 2:
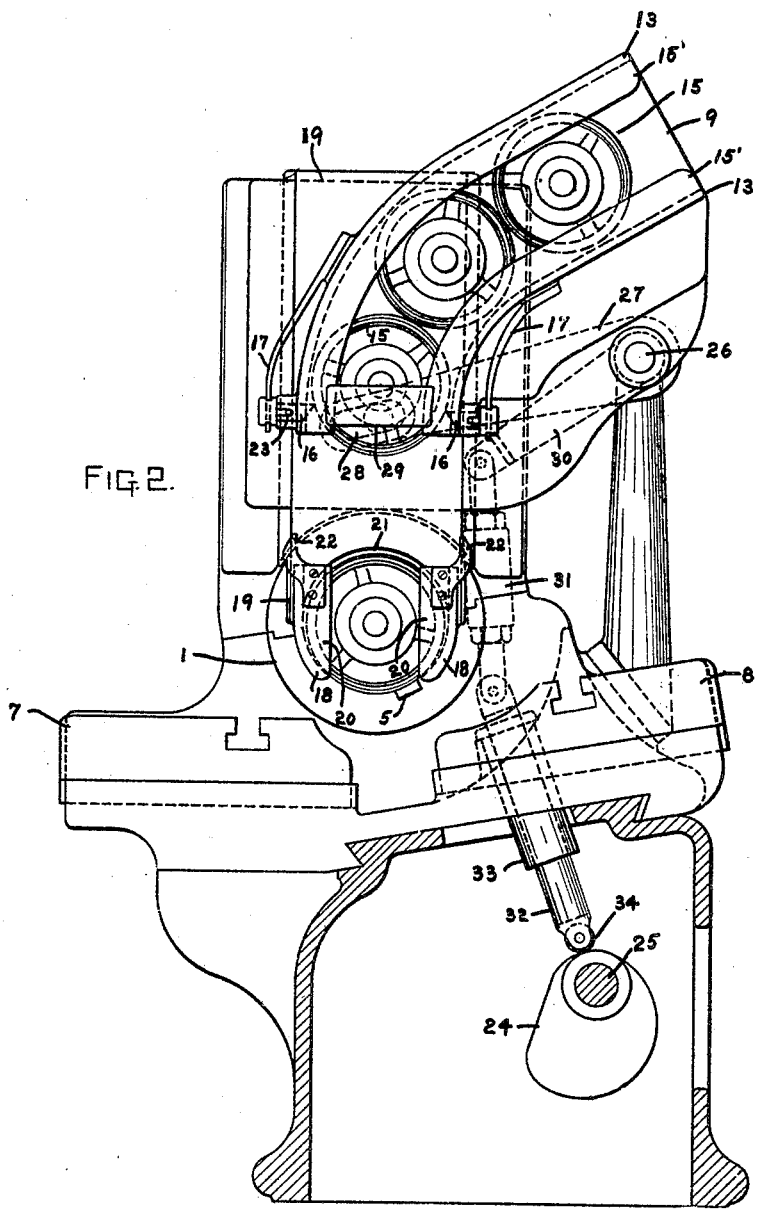

Referring to the drawings, Figure 1 is a side elevation showing a mechanism embodying the present improvements in their preferred form and the manner of applying said mechanism to a machine. Fig. 2 is a front elevation of the same.

As shown in the drawings, the machine to which the improvements are applied is provided with a work-support in the form of a chuck 1, secured to a spindle 2, which is driven by a pulley 3, secured thereto. The chuck is provided with a recess 4 in its face constructed to receive the blanks and with the jaws 5 for holding said blanks while they are operated on by the tools carried in the turret 6 and by the cross-slides 7 and 8. The turret may be indexed and reciprocated and the cross-slides operated by any suitable mechanism, as by the mechanism shown in Patent No. 586,922, granted July 20, 1897, and the jaws of the chuck may be operated and the blanks ejected from the chuck after being acted on by any suitable and well-known mechanism.

The magazine 9 for the blanks is located at one side of the chuck 1, preferably above, as shown, so that it will not interfere with the proper operation of the tools upon the blank, and said magazine is formed or supported on a plate 10, carried by arms 10', which project from a plate 11', secured to an arm 11, formed on the cap 12 of the front bearing for the spindle. In the form shown the magazine is provided with two upwardly-extending guides 13 for guiding and retaining the blanks 15. The lower ends of said guides lie in planes upon opposite sides of the chuck and the delivery-opening of the magazine-face of the chuck.

The blanks are prevented from escaping from the exit end of the magazine by two pins 16, which project into this end of the magazine and form stops for engaging and supporting the blanks. The guides 13 are provided with flanges 15', which overlie the blanks and hold them between said guides. The pins 16 are pressed inward by springs 17 and are moved back to release the end blank and allow it to pass to the carrier by means to be described. The carrier consists of two supports 18, secured to or formed on a slide 19, guided in the plate 10, said supports being in line with the guides 13 and forming extensions of the guides 13 when the carrier is in its normal position at the exit end of the magazine. The supports 18 are provided at their front with inwardly-projecting flanges 20, which are arranged to overlie the blank in the carrier. The slide 19 is cut away at 21 to form the discharge-opening of the carrier, through which the blanks may be discharged into the chuck 1 when said opening is brought in front of said chuck. Two cams 22 are secured to the carrier, and when the carrier is in its normal position said cams engage pins 23, projecting from the pins 16, and hold pins 16 retracted, so that the end blank is free to pass into the receiver, the blanks at this time being supported from the supports 18 of the carrier.

The slide 19 may be reciprocated to operate the carrier by any suitable mechanism and, as shown, is operated at the proper time from a cam 24, secured to a shaft 25, which may be the intermittently-operated shaft shown in the patent referred to for operating the jaws of the chuck. A shaft 26 is mounted in suitable bearings and is provided with an arm 27, having a slot 28 in its end which engages a stud 29, secured to the back of slide 19. A second arm 30 is secured to the shaft 26 and is connected, by means of a link 31, to one end of a rod 32, guided in a bearing 33 and having a roll at its other end which rests on cam 24, being held against said cam by the weight of the slide 19 and carrier.

The operation is as follows: While the tools are acting on the blank held in the chuck the carrier stands at the discharge end of the magazine, with the cams 22 holding the pins 16 retracted, the blanks 15 being supported from the supports 18 and the roll 34 resting on the lobe of cam 24. When the blank in the chuck has been completed, the shaft 26 is rotated and the jaws of the chuck opened and the completed blank ejected. As the shaft 26 revolves the roll 34 passes down the cam 24, and the carrier moves in line with the lower ends of the guides 13 down across the face of the chuck 1 and into position to bring its discharge-opening in front of the recess in the chuck. As the carrier moves away from the magazine the pins 16 are released and move in to support the blanks in the magazine. When the carrier arrives in the position shown in Figs. 1 and 2, the turret 6 is moved forward and the ejector 35 carried thereby forces the blank in the carrier through the discharge-opening of said carrier directly into the recess in the chuck. The jaws are now closed, the carrier returns to the magazine, and the turret is moved back and indexed to bring a tool into position to act on the blank. When the carrier reaches the magazine, the pins 16 are retracted by cams 22, and the end blank in the magazine drops into the carrier ready to be transferred to the jaws of the chuck. By thus mounting the magazine upon the frame one or both of the cross-slides may be used to carry tools for acting upon the blank, and by using a carrier the discharge-opening of which faces the work-support when said carrier is in position to bring the blank in front of the support said blank may be discharged directly into or upon said support, and the time expended in presenting a new blank to the work-support thereby reduced.

What I claim as my invention, and desire to secure by Letters Patent, is—

1. The combination with a work-support, of a magazine having its delivery-opening facing the work-support, a carrier, means for moving said carrier from the delivery-opening of the magazine into position in front of said work-support and returning said carrier to said delivery-opening, and means for transferring the blank from the carrier to said work-support, substantially as described.

2. The combination with a work-support, of a magazine having its delivery end above said support, a carrier, means for moving said carrier from the delivery end of the magazine into position in front of said work-support and returning said carrier to said delivery end, and an ejector for transferring the blank from the carrier to the support, substantially as described.

3. The combination with a work-support, of a blank-magazine provided with upwardly-extending guides, the lower ends of said guides lying in planes upon opposite sides of said support, a carrier, means for moving said carrier from the ends of said guides to the support, and means for transferring the blank from said carrier to the support, substantially as described.

4. The combination with a work-support, of a blank-magazine above said support, a carrier having a discharge-opening at its back, means for moving said carrier from said magazine to a position in front of said support and returning said carrier to the magazine, and means for transferring a blank from said carrier to the support, substantially as described.

5. The combination with a work-support, of a magazine provided with guides, a carrier having supports forming extensions of said guides, means for reciprocating said carrier in line with said guides, and means for transferring a blank from said carrier to the support, substantially as described.

6. The combination with a work-support, of a magazine provided with guides, inwardly-projecting stops at the ends of said guides, a carrier reciprocating in line with said guides, means on said carrier for operating said stops, and means for transferring a blank from said carrier to the support, substantially as described.

7. The combination with a work-support, of one or more cross-slides, of a blank-magazine secured to the frame of the machine, a carrier for carrying the blanks from the magazine into line with said support, and means for transferring the blanks from the carrier to the support, substantially as described.

8. The combination with a work-support, of a tool-carrying turret, one or more cross-slides, a blank-magazine secured to the frame, a blank-carrier, and an ejector carried by said turret, substantially as described.

9. In a feeding attachment, the combination with a blank-magazine provided with guides, a carrier provided with supports arranged to be brought into line with said guides, means for reciprocating said carrier in line with said guides, and means for retaining the blanks in said magazine, substantially as described.

10. In a feeding attachment, the combination with a blank-magazine provided with guides, a carrier having supports forming extensions of said guides, and means for reciprocating said carrier in line with said guides, substantially as described.

11. In a feeding attachment, the combination with a blank-magazine provided with guides, inwardly-projecting stops at the ends of said guides, a carrier reciprocating in line with said guides, and means on said carrier for withdrawing said stops, substantially as described.

12. In a feeding attachment, the combination with a blank-magazine provided with guides spring-pressed stops at the exit ends of said magazine, a reciprocating slide provided with supports in line with said guides, and cams on said slide for operating said pins, substantially as described.

SAMUEL L. WORSLEY.

Witnesses:
R. A. BATES,
IRA L. FISH.